United States Patent [19]
Ridler et al.

[11] 3,966,330
[45] June 29, 1976

[54] PHONOGRAPH RECORD DETECTING ARRANGEMENT

[75] Inventors: Keith Douglas Ridler, Fulbourn; Colin Howard Stanwell-Smith, Balsham, both of England

[73] Assignee: Strathearn Audio Limited, Belfast, Northern Ireland

[22] Filed: Nov. 27, 1974

[21] Appl. No.: 527,636

[30] Foreign Application Priority Data

Dec. 4, 1973   United Kingdom............... 56188/73
July 2, 1974   United Kingdom............... 29281/74
July 2, 1974   United Kingdom............... 29282/74

[52] U.S. Cl............................... 356/156; 250/571; 274/15 R; 274/39 R; 356/201; 356/209
[51] Int. Cl.².................... G11B 3/60; G11B 17/04

[58] Field of Search............ 356/156, 157, 201, 209; 250/216, 566, 571; 274/1 R, 15 R, 39 R

[56] References Cited
UNITED STATES PATENTS 3,368,080   2/1968   Nakagiri et al. ................. 274/15 X
3,804,422   4/1974   Kobashi et al. ............... 274/39 R X

*Primary Examiner*—Siegfried H. Grimm
*Attorney, Agent, or Firm*—Laff, Whitesel & Rockman

[57] ABSTRACT

The presence and size of a recorded disc on a turntable is detected and indicated by the interruption of a beam or beams of energy which passes in the plane of the disc, through a hole or holes in a turntable, or beneath the turntable.

12 Claims, 28 Drawing Figures

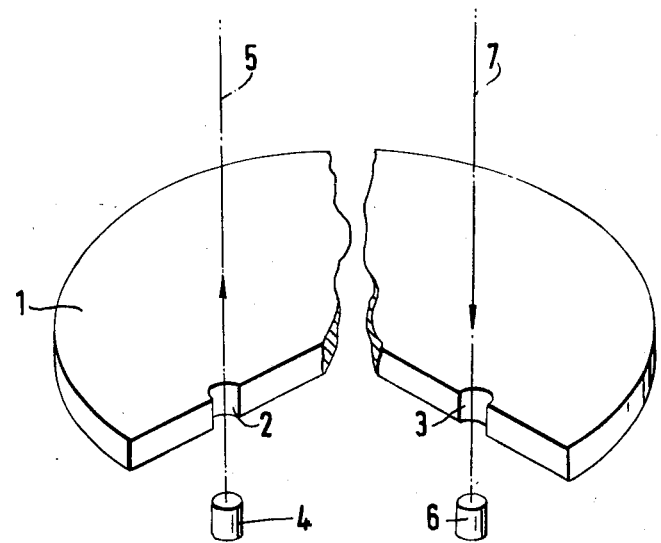
FIG. 1a.
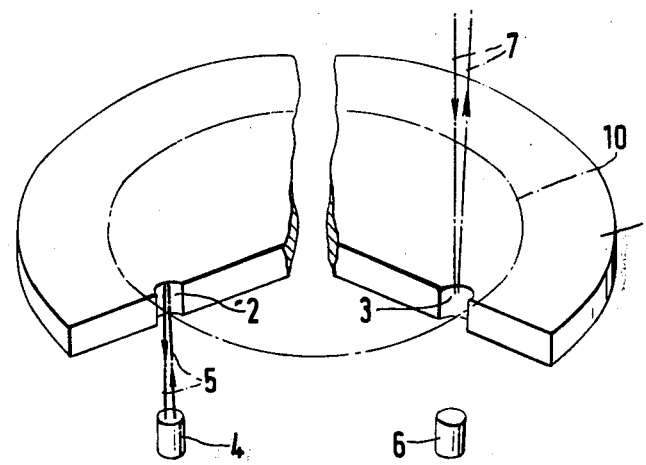
FIG. 1b.
FIG. 2.
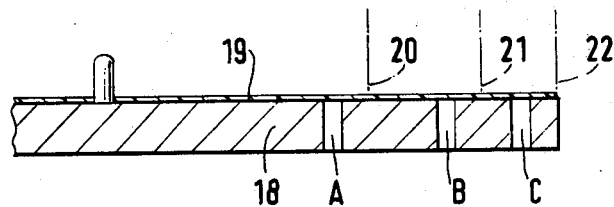

PHONOGRAPH RECORD DETECTING ARRANGEMENT

This invention relates to a method and apparatus for use in detecting the presence of a recorded disc upon the turntable of a phonograph or other disc, e.g. video disc, player. In a preferred embodiment, the size of the disc can also be determined. Information thus obtained relating to the size of the disc can be used in controlling the positioning of a pict-up arm, either manually or automatically, so that the stylus of the pick-up arm can be accurately located on the disc and the risk of damage to the stylus is reduced. The disc size information may also be used to select the rotational speed of the turntable automatically.

Records and the styli that are used in record reproduction are extremely delicate and can easily be damaged irreparably. This is particularly true where manual handling of the stylus carrying device, subsequently referred to as the pick-up arm, occurs. It is possible to automate the cueing-in of the pick-up arm to the commencement, or any other point, of a record and its subsequent removal at the end, or any other point, of the record. It is also possible to control the pick-up arm by remote manual adjustments, thus maintaining the arm free from manual contact. However, both of these techniques still rely heavily on human judgement.

If, prior to the initiation of automatic, manual, remote or direct, operation of a record reproducing device, the presence and size of a record are incorrectly programmed into a record reproducing unit, then the meeting of stylus and record at the desired point may not occur. Indeed, the meeting of stylus and record may not occur at all, the stylus possibly falling short of the record and landing on the record reproducing unit's upper surface, or even on the possibly rotating turntable, with consequent detrimental effects to the stylus. Most video disc players are designed to play at faster speeds all the more likely to create risks of damage.

To overcome these potentially inconvenient or damaging eventualities, it is desirable to incorporate a device into the record reproducing equipment which automatically detects the presence or absence of a record on the turntable and also detects its size. The data ascertained by the detection device may then be used, for example, to correctly and automatically cue-in the pick-up arm to the commencement or any other part of the record, to override incorrectly programmed data concerning the desired operation of the record reproducing equipment, or to override incorrect or inaccurate remote, or possibly direct manual, operation. It is found desirable to avoid sensing by moving mechanical feelers, e.g. pivoted fingers which detect presence and size, because they rub against the disc records in use, and become worn. They then either give false data about the records, or the wear has to be compensated for. Also such feelers usually have to offer resilience, to avoid impact damage, and their degree of resilience changes with age. They also tend to be avoided by high-fidelity enthusiasts, or in any arrangement not incorporating an auto-changer, which is often not required or is actually undesirable.

It is often found that a record will fail to drop with an auto-changer which has already detected its presence. The "record present" condition will have been signalled, but the pick-up stylus will probably not contact any record. The present invention can therefore be used to provide a second line of defence against such false indications, and so be very useful with auto-change mechanisms.

It is most advantageous if as few moving parts as possible are used in detecting the presence of a record, and many embodiments of the present invention employ none, apart from items rotating with the turntable.

According to the present invention there is provided apparatus for use in detecting the presence of a disc record on a turntable, including a source of energy and a detector of the energy, the arrangement being such that a path for the energy is set up between the source and the detector, and that the path is modified by the presence of a disc record on the turntable.

In certain embodiments of the invention equipment added by reason of the invention can be all located below the turntable, and so not obstruct normal operation, e.g. the loading and unloading of records, at all. Alternatively, the extra parts can be located in holes in the turntable, or to one side of the loading area. These parts need have very little inertia or weight and they may generate no or very little noise in operation. The detection of presence or size will generally result in an electrical output signal, which can be easily adapted to energise alarm bells, relays, lights, generate switch-off or change-speed signals, or be amplified. The presence signal will often be a pulse repeated at the disc revolution rate.

Embodiments of the invention to be described incorporate opto-electronic devices using visible or near visible radiation, referred to herein as light, but arrangements in accordance with the invention can incorporate other techniques, including techniques using electromagnetic radiation other than that in the visible or near visible spectrum. Preferred embodiments use a stationary radiation or illumination beam or beams, although one very favourable arrangement does use a small "sweep" amplitude of an otherwise stationary beam, to give some tolerance in relative positioning.

In one embodiment the turntable has a surface quality distinguishable from that of the record, e.g. reflectivity to some radiation. In another embodiment the record may control a movable flap or other body which is attached to the turntable thereby giving a part of the turntable surface a quality distinguishable from the turntable surface generally.

As aforesaid, it is particularly desirable to keep the space above a phonograph turntable free of obstructions and the present invention provides a radiation detector arrangement, and a prism for use in the arrangement whose use in detecting the presence of a record on a turntable enables the space above the turntable to remain comparatively uncluttered. Other embodiments provide protection against false indications due to stray light or other ambient radiations.

Embodiments of the invention will now be described, by way of example, with reference to the accompanying drawings in which:

FIGS. 1(a) and 1(b) show cut-away perspective views of a turntable.

FIG. 2 shows schematically a section through a part of a turntable.

Figure 5A:
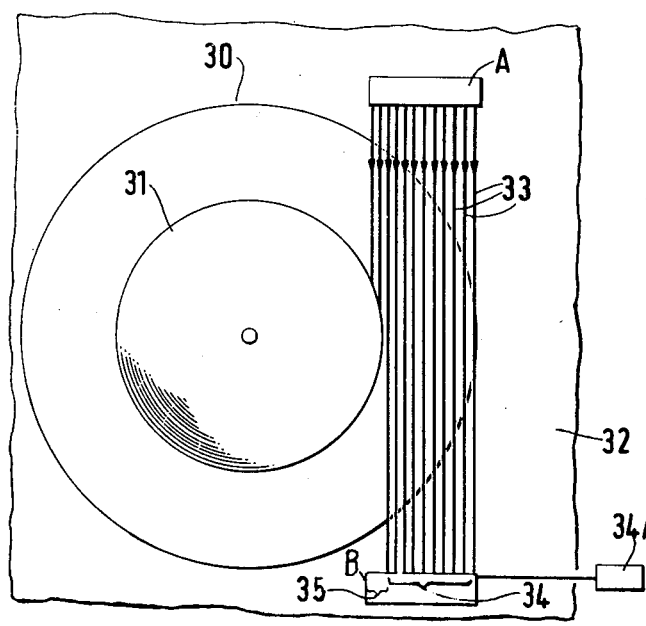
Figure 5B:
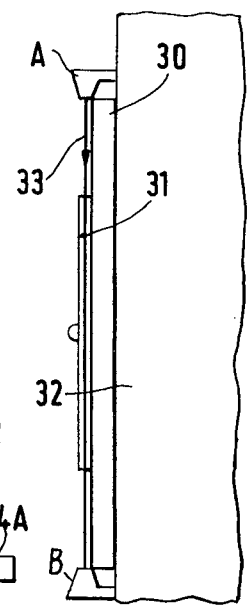
Figure 6:
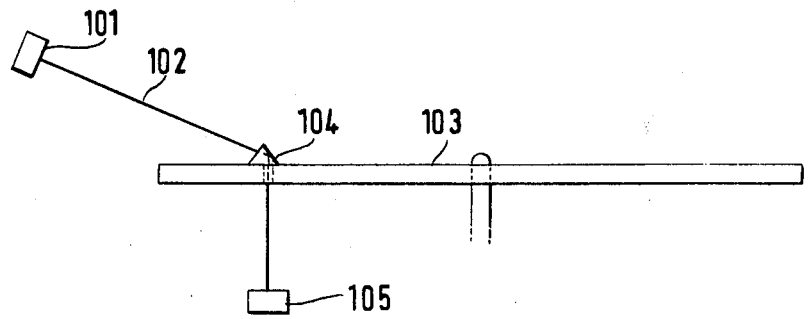

FIGS. 5(a) and 5(b) show plan and side views of a further turntable and detector arrangement, FIG. 6 is a diagrammatic side elevation of a turntable,

3

Figure 7A:
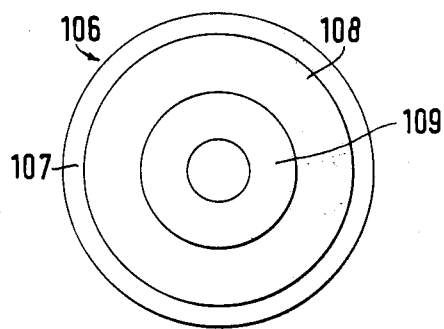
Figure 7B:
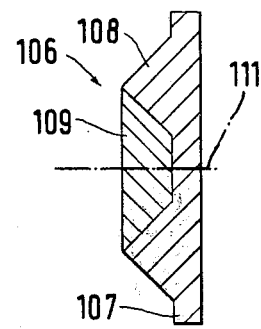
Figure 8:
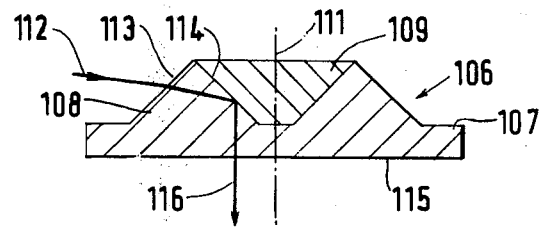
Figure 9A:
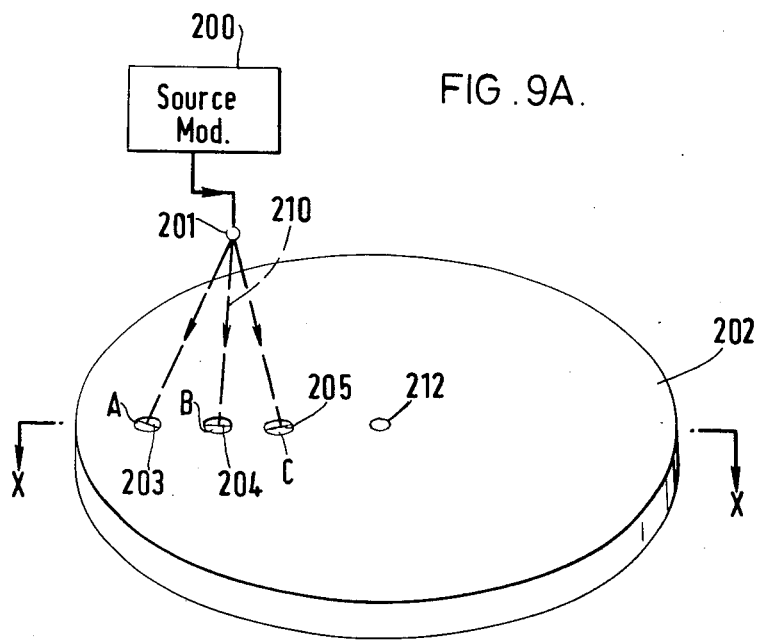

FIGS. 7(a) and 7(b) show respectively a plan view and a side elevation of a prism, FIG. 8 shows a side elevation of the prism of FIG. 7 indicating the path of a light beam, FIG. 9A shows a perspective view of a turntable for recorded discs, a (light) radiation source and special holes in the turntable.

FIGS. 9B, 9C, 9D and 9E show in perspective and a sectional view on the line X—X details for use in FIG. 9A, FIGS. 10 (a) (b) and (c) and FIGS. 11 (a), (b) and (c) show by sections, alternative details for use in FIG. 9A, FIGS. 12A and 12B, 13A and 13B, and 14A and 14B show respective sectional views of a turntable and controllable apertures therein, in alternative embodiments.

Referring to FIGS. 1 (a) and (b) there is shown at 1 a turntable having two holes 2 and 3. Beneath the hole 2 there is shown a light source and detector arrangement 4 which are coincident with one another. A beam of light 5 from the light source 4 is shown passing through the hole 2. Beneath the hole 3 there is a light detector 6. A beam of light 7, from a source of light not shown, passes through the hole 3 and impinges upon the detector 6.

In FIG. 1(b) a disc or record 10 indicated by a dotted line is positioned on top of the turntable 1. The beam of light 5 from the source 4 is shown reflected by the disc 10 back through the hole 2 so that it impinges upon the detector 4. The detector 6, however, no longer receives the beam of light 7, which is intercepted and reflected by the disc 10.

As will be seen from the following description a turntable having a single hole and either the combined light source and detector 4 or a remote source of light and the detector 7 can be used to detect the presence of a disc.

In operation, considering the combined light source and detector arrangement 4, and the situation shown in FIG. 1(b), with a disc 10 placed on the turntable 1, a short burst of reflected light will be received at the detector 4 from the disc 10 through the hole 2 for each revolution of the turntable, assuming that the lower surface of the turntable is non-reflecting to the light. Alternatively, if the lower surface of the turntable 1 is made reflecting, a continuous beam of reflected light will be received by the detector 4 when a disc is in position over the hole 2.

In the absence of a disc 10 on the turntable 1, no reflected light will be received by the detector 4 when the lower surface of the turntable is non-reflecting and the detector is therefore not activated, assuming that no stray light of an intensity sufficient to activate the detector passes through the hole 2. If the lower surface of the turntable is reflecting to light, a continuous beam of light will be received by the detector 4, except when the hole 2 passes above the detector, assuming again that the stray light passing through the hole is of insufficient intensity to activate the detector. Logic circuitry associated with the detector 4 can be used to give an indication of the absence or presence of a disc 10 according to the particular signal conditions.

Considering the detector 6, it will be seen from FIG. 1(a) that in the absence of a disc, the device 6 will detect a burst of light once per revolution of the turntable, while in the presence of a disc no light will be detected by the device 6. Logic circuitry may again be used to interpret the signals and give an indication of the presence or absence of a disc.

Should it be necessary to increase the duration of the pulses of light received by the detectors, the holes 2 and 3 can be enlarged in the circumferential direction. It is also possible to increase the frequency of the pulses by increasing the number of apertures at a common radius. In such an arrangement the logic circuitry has to detect the absence or presence of a plurality of pulses per revolution of the turntable, in order to determine the presence or absence of a record.

From FIG. 2, which shows a turntable 18 having perforations or holes A, B and C, it can be seen that a 7-inch record having a circumferential edge indicated by the line 20 covers the hole A, that a 10 inch record having a circumferential edge indicated by the line 21 covers the holes A and B and that a 12 inch record having a circumferential edge indicated by the line 22 covers the holes A, B and C. Logic circuitry can thus be designed for use in association with optical detectors such as those shown at 4 and 6 in FIG. 1 in such a way that when the holes A, B and C are unobscured an indication is given that there is no disc on the turntable, that when the hole A is obscured and the holes B and C are unobscured there is a 7 inch disc on the turntable, that when the holes A and B are obscured and the hole C is unobscured there is a 10 inch record on the turntable and that when the holes A, B and C are all obscured there is a 12 inch disc on the turntable. The holes may be duplicated on common diameters if required and the number, type and location of the opto-electronic detectors 4 or 6 can be arranged as required.

Figure 3:
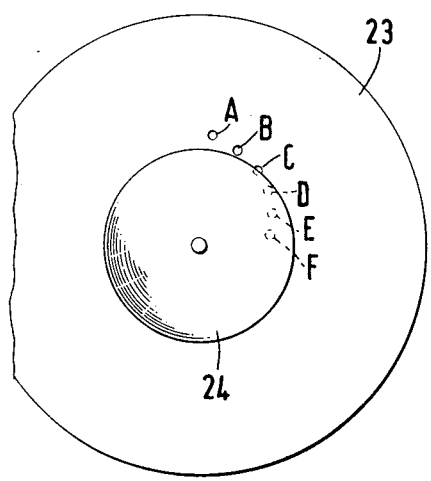
FIG. 3 shows a plan view of a further turntable.

Referring to FIG. 3, there is shown an arrangement by means of which it is possible to detect the diameter of a disc more precisely. In the arrangement shown a turntable 23 has an array of holes A, B, C, D, E and F arranged in a spiral pattern. A disc 24 is shown on the turntable 23 and it can be seen that the holes C, D, E and F are obscured by the disc 24 while the holes A and B are unobscured. Since the holes, A, B, C, D, E and F are all at known radii, it is possible to obtain a combination of signals from a plurality of detectors each of which is associated with a respective hole, which gives a relatively precise indication of the size of a disc on the turntable. Alternatively a single long detector capable of providing a signal proportional to that part of the hole detector that is, or is not, subjected to light pulses through the holes can be used to determine the size of a disc.

Figure 4:
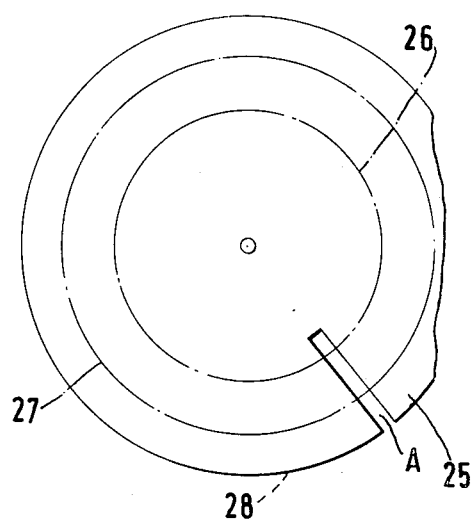
FIG. 4 shows a plan view of yet another turntable.

FIG. 4 shows a plan view of a turntable 25 having a radial slot A and upon which the circumferences of 7 inch, 10 inch, and 12 inch discs are indicated at 26, 27 and 28. A detector capable of giving an indication of length of the slot which is obscured by a particular disc is arranged beneath the slot A and signals can thus be obtained from such a detector which indicate the size of any disc which extends between the ends of the slot A.

It will thus be seen that the record detection and measurement techniques so far described rely upon the use of an aperture or apertures in the turntable of reproduction apparatus. The apertures may be partially or wholly obscured by the presence of a disc. A detection device, or detection devices, situated beneath the turntable detect the absence, or presence, of a disc by the presence, or absence, of light transmitted intermittently through the partially obscured, or unobscured aperture or apertures, to the detector or detectors from above the turntable, or by the absence or presence of light from a source or sources beneath the turntable reflected from that part or those parts of the disc obscuring or partially obscuring the aperture or apertures.

Referring to FIGS. 5 (a), (b) further methods of modifying a beam of light will now be described. FIGS. 5 (a), (b) show a turntable 30 upon which there is placed a 7 inch recorded disc 31. Beneath the turntable 30 there is a base 32 of phonograph apparatus. Upon the base 32 there are mounted a source of light A and a light detector B. Light rays 33 pass from the source A to the detector B and it will be seen that light is received over the region 34 of the detector B, while since a part of the beam of light is impeded by the disc 31, no light is received over the region 35 of the detector B. The detector B can consist of an array of separate opto-electronic detection devices, each capable of detecting the presence or the absence of incident light from the light source A, or a single long opto-electronic device capable of producing an output signal proportional to that part of its length that is exposed to incident light from the light source A. It will be seen that when no disc is present on the turntable 30, all parts of the detector B will receive light from the source A. When a disc is present on the turntable, the number of detectors in the device B, or the proportion of the single long detector in the device B, receiving incident light from the source A, is dependent upon the diameter of the disc. The detection device operates whether the turntable is stationary or rotating. When a plurality of separate opto-electronic detector devices is employed in the detector B, the minimum number required to provide associated logic circuitry with sufficient information to enable it to produce output signals distinguishing between the situation in which there is no record on the turntable, a 7 inch diameter record, a 10 inch diameter record, or a 12 inch diameter record on the turntable, is three. A greater number of discrete detector devices, or a single long detector device capable of producing an output signal proportional to its length receiving incident light from the source A, may give a more precise measurement of the diameter of a disc, if this is required. The path between the source of light and the detector device may be differently arranged from that shown and instead of modifying the beam by simply blocking a part of it, the beam can be modified by affecting some other physical characteristic, for example its power of reflection, diffraction, dispersion, or polarisation.

It is also possible to include a detector adjacent to the source of light at A and to provide at B a reflector. Furthermore instead of using a beam which passes directly from a source to a detector the beam can be bent by a reflector before it reaches the detector.

In a modification of the arrangement shown in FIGS. 5 (a), (b) the beam, instead of being transmitted parallel to the disc 31, is transmitted from the source A, which is positioned a little above the height of the disc 31, at a shallow angle to the disc 31 so that reflection occurs from the surface of the disc. It can be arranged that the degree of reflection from the surface of the turntable differs from that from the disc so that the presence and position of a disc can be determined. Alternatively the diffraction effects produced by the presence of the grooves on the disc can be used to modify a reflected beam and thereby distinguish between reflections from the turntable and reflections from a disc.

In each case the detector devices will be arranged in such a way that signals can be applied to logic circuitry 34A to enable the distinctions between particular sizes of disc to be determined.

Referring to FIG. 6, there is shown a source 101 from which a beam 102 of light radiations is directed towards a turntable 103. A prism 104 is so positioned on the turntable that, as the turntable 103 rotates, the beam 102 is able to strike the prism 104 and be directed by the prism 104 through a hole in the turntable on to a detector 105. The prism 104 is positioned at such a radial distance from the centre of the turntable 103 that a record of a given radius intercepts the beam 102 and signals, by the absence of a light beam at the detector 105, that the record is of the given radius. Two or more prisms, each with its own detector positioned beneath it, can be arranged at respective radial distances from the centre of the turntable in such a way that a respective light beam from the source 101 directed towards a respective detector by a prism is interrupted when a record of a given respective radius is placed on the turntable. The outputs from the detectors can thus be interpreted to give an indication of the radial size of a record.

It will be observed that, in the diagrammatic view shown in FIG. 6, the prism 104 is above of the surface of the turntable 103. In fact, the top of the prism is arranged to be level with the tops of a number of concentric rings formed on the surface of the turntable 103, thereby enabling the record to lie flat and the beam of light 102 to reach the prism 104 via a channel between adjacent grooves. Alternatively the top of the prism could be level with a plane surface of the turntable 103 and a groove or channel could be provided in the surface of the turntable in order to enable the beam 102 to reach the prism 104.

Referring to FIGS. 7 (a), (b) and 8, there is shown a preferred design of a prism 106 which is constituted by a part 107 providing an annulus 108 of triangular cross-section and a central portion 109 in the form of a frusto-conical boss. It will be seen that the prism is symmetrical about its axis 111, thereby enabling the parts 107 and 109 to be made comparatively easily, for example by moulding using transparent plastics materials. The moulds required for moulding the shapes can also be made comparatively easily, for example by turning.

Referring to FIG. 8, in particular, it will be seen that a beam 112 of light which is incident on the face 113 of the part 107 is refracted towards the interface 114 between the part 107 and the portion 109 and is directed, as a result of internal reflection, towards the face 115 of the part 117 from which it emerges at 116 after further refraction.

The face 113 of the part 107 and the faces of the part 107 and the portion 109 at the interface 114 are curved and the face 115 of the part 107 can be flat or either convex or concave to give further focussing control as required. It will be noted that the curved face 113, and the curved faces at the interface 114 also provide a desirable focussing effect. It will be appreciated that the emerging beam 116 changes its position as the incident beam 112 strikes different portions of the face 113 causing a "sweep" pattern which allows tolerance in the siting of the detectors.

In the set of embodiments illustrated in FIGS. 9A to 11, the overall configuration used is similar to that of the non-reflecting arrangements described with reference to FIGS. 1, 2, 3 or 4, in that the approach used requires a minimum of three holes in the turntable in conjunction with various transmission technique for detecting the presence of the record. That is, light detectors are situated on one side of the platter (turntable) and a light source or light sources are situated on the other side. The presence and size of a record disc can then be detected according to the periodic obscuration or nonobscuration of the light path through the holes as the platter rotates. One configuration has a light detector or light detectors, associated with the hole or holes, arranged beneath the platter. The light source or light sources are situated above the platter. A feature of difference between this technique and those of FIGS. 1-4 is that the light source or light sources need not be, indeed are preferably not, situated directly above the platter, but to one side. In this way the light source(s) and accompanying structure(s) of the embodiments of FIGS. 9 to 11 may provide less obstacle to the placing of records on or the removing of records from, the platter.

Referring particularly to FIG. 9A, a single light source 201 is used and if a record (not shown) is not present on a turntable 202 some of the light emitted from the source 201 is periodically reflected by reflectors A, B and C mounted or otherwise provided in one or more apertures 203, 204, 205 of the turntable to detectors (not shown) sensitive to radiations from the source 201 and situated beneath the turntable, as it rotates. This light may be labelled in such a way that it is of different character or colour from ambient light, e.g. it can be modulated by a source modulator unit 200 or chopped, in order to readily distinguish it from ambient light. The holes 203, 204, 205 in the turntable could be of almost any shape, but the reflectors or mirrors need to be oriented correctly in order to pick up and direct to the detectors the labelled light emitted from the source 201. (These orientations may be different and probably less critical if more than one source 201 were used). The reflecting surfaces could be generally vertical, e.g. plane mirrors in a vertical plane (assuming a horizontal platter or turntable 202), but, if a desirable detector position dictated otherwise, the plane of the mirror could be adjusted to suit. Alternatively, curved mirrors could be advantageously used and other optical elements, such as lenses, could be introduced into the system. The inserts in the holes 203, 204 and 205 need not be reflectors they could direct the energy beam by, for example, refraction.

Figures 9B, 9C, 9D:
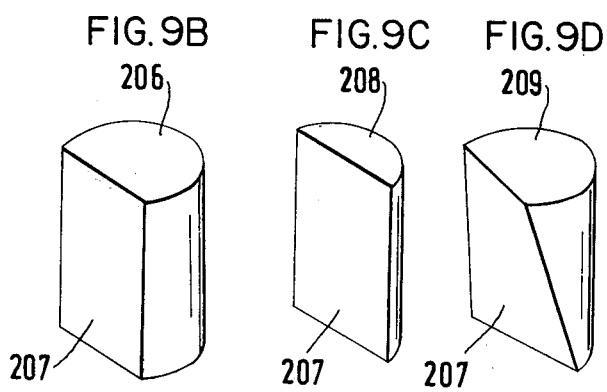
Figure 10A:
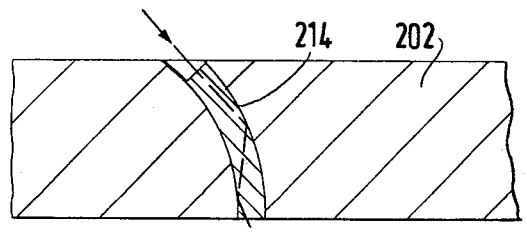
Figure 10B:
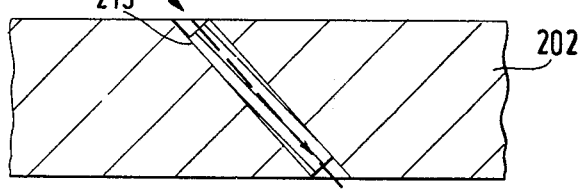
Figure 10C:
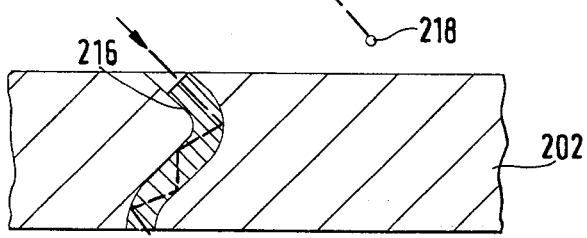

A particularly simple and cheap combination of hole and mirror will now be described. FIGS. 9(B), 9(C), 9(D) illustrate, in perspective, alternative partial plugs of a reflecting material, such as PERSPEX having an adequate refractive index if internal reflections are to be used. The plugs may be either moulded, machined or otherwise simply and cheaply produced, and then inserted into apertures 203, 204 or 205, which are in the form of cylindrical holes in the platter 202. Each inserted plug can then readily be lined up with the light source for one position of the platter 202 before fixing it permanently, by the rotation of each plug within its hole 203, 204 or 205 until a satisfactory response by the detector is achieved, for that one position of the turntable.

FIGS. 9(B)-9(D) show three possible plug shapes for the reflectors in any or all of the three holes 203, 204 and 205 of the turntable 202, one plug shape 206 is somewhat more than a semicircular cylinder, the second possible plug 208 is somewhat less than semi-cylindrical, and both have a vertical reflecting surface 207, i.e. assuming the axis is vertical, as illustrated. Obviously the shape 206 is the easier to fix in position, but either shape may be used, depending on the position of the one or more light sources 201 and the one or more detectors beneath the turntable. It would be possible if three holes were to be used, as shown, for there to be three sources of light energy. However one common detector could be used, if economy in space or expense so required it, by labelling each of three different light sources 201 in a different way, e.g. by colour or by modulation. The three reflecting surfaces 207, would then possibly each have to be at a different angle to the vertical. Alternatively three detectors and one source could be used. The plug 209 has a reflecting surface 207 which is variably inclined to the general cylindrical axis of the plug, to give greater flexibility in the angles of incidence and reflection. If highly refractive transparent plugs are used, the light can enter the top surface of the plugs as illustrated, and leave the bottom surface after deflection by an internal reflection. Materials which may be used for the plugs include glass and PERSPEX or other transparent or translucent materials and may have a plane silvered surface. Many alternative configurations can be used, for example the reflecting surface can be curved if focussing to some degree, or perhaps illumination of the detector for a longer period are to be desired.

Figure 9E:
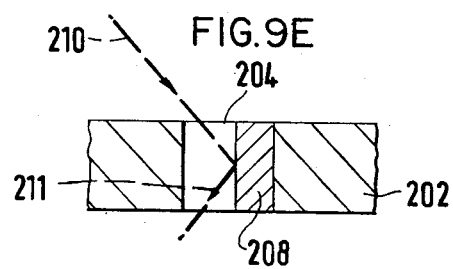

Referring to FIG. 9(E), the hole 204 can be seen in a side sectional view of the turntable 202 viewed on the line X—X of FIG. 9A. The hole 204, which is assumed to be cylindrical, can be seen to have a plug, such as 208, occupying less than half of the space in the hole 204 and presenting a vertical external reflecting, e.g. silvered, surface 207 to a light ray 210 from the source 201, which ray 210 is deflected along a path 211 to a detector (not shown) beneath the platter 202.

In use, consider for example the one source 201 (ignoring for the present the modulator or "labeller" unit 200), illuminating the three holes as shown in FIG. 9A such that when no disc is on a central spindle 212, three plugs (e.g. 206, 208 and/or 209 of FIGS. 9(B)-9(D) reflect the light in different directions to three separate detectors beneath the turntable respectively. If a 12-inch disc is on the turntable platter 202 no light can reach any of the detectors since the holes A, B and C are all covered, a 10-inch disc leaves the hole 203 uncovered, while a 7-inch disc also allows light to be reflected from the plug in the hole 204, but not from the plug in the hole 205.

When a surface 207 is in a vertical plane, it is not practical to position the source 201 vertically above it or there would be no reflection from it. However, the source 201 can be positioned well clear of the area over the turntable emitting radiations which can be reflected from a vertical surface 207, and so be no obstacle to (manual) loading of the turntable with disc records. Objects, such as light sources, positioned directly over the turntable would offer serious hindrance to the operation of the equipment and make it necessary for records to be placed very carefully on the equipment in order to avoid damage to the records and the playback equipment. It will be realised that the detector is illuminated once per revolution, or more if multiple holes on a given diameter are used, so that any modulation to label or distinguish the light source from others or ambient light will have to use a high frequency compared with the one or more pulses of light available per revolution of the turntable platter 202 according to the number of holes in the platter. It will be appreciated that with a platter rotating at 45 r.p.m., the number of pulses per minute will be 45 or multiples thereof.

In another embodiment used in a similar fashion the plugs of FIGS. 9(B)–9(D) are replaced by short lengths 213 of fibre optic at the location of one or more of holes 214, 215 or 216 in the platter (see FIGS. 10(a)–(d)). FIGS. 10 (a) (b) and (c) show alternative platter arrangements in sectional views, these lengths 213 of fibre optic may be straight as in hole 215 at FIG. 10(b) or curved as in the holes 214 or 216 in FIGS. 10(a) and 10(c) in order to maximise the light transmission from a light source above and to the left of the hole to a respective detector 217, 218 or 219 when the light path is not obscured by a record of the appropriate size. The well known property of fibre optics of channelling the light is thus used. None of the holes can be vertical, as in FIG. 9, along its entire length.

Figure 11A:
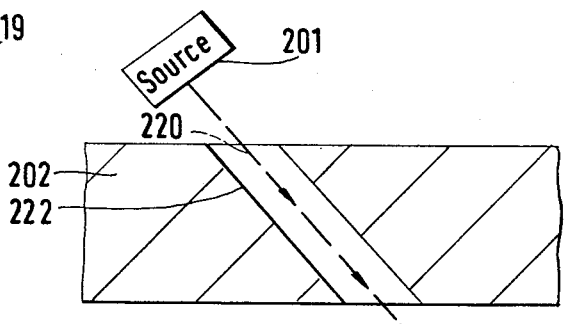

A further similar embodiment, which is shown in FIG. 11(a), utilises a simple hole 222 drilled at an angle of other than 90° to the platter surface in such a way that its axle is, once per revolution of the turntable, parallel and coincident with a light path 220 from a source to a detector 221 as the platter rotates. In this case the straight bore of the hole 222 need not be polished. Otherwise the hole may be vertical as shown in 223 in FIG. 11(b) or curved as shown at 224 in FIG. 11(c) so that light rays 225 or 226 perform one or more reflections en route through the holes to respective detectors 227 and 228.

Figure 11B:
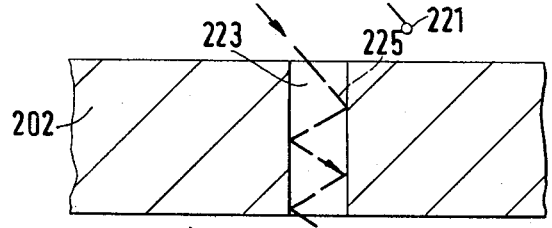
Figure 11C:
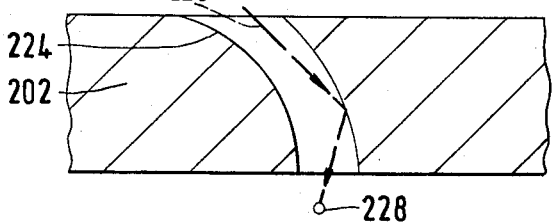

FIGS. 11(a) to 11(c) thus show three further embodiments for avoiding a light source in the space vertically above the turntable. The holes shown in FIGS. 11(b) and 11(c) should preferably be kept well polished, and perhaps protected with a transparent plug of glass or the like. The three holes of FIG. 9A may of course be replaced by holes as in any one or as all three of those of FIGS. 11(a)–(c). The use of these detectors but only one source being again feasible. Care in use may sometimes have to be taken to prevent obscuration of the channels 222, 223 or 224 with fluff or dust.

Figure 12A:
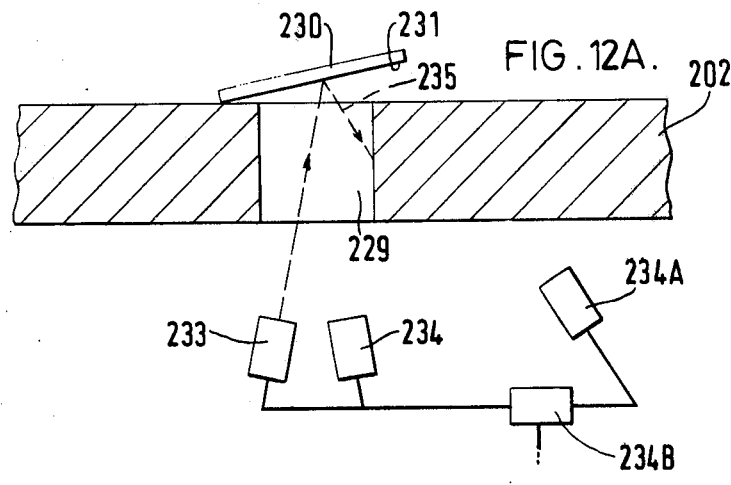
Figure 12B:
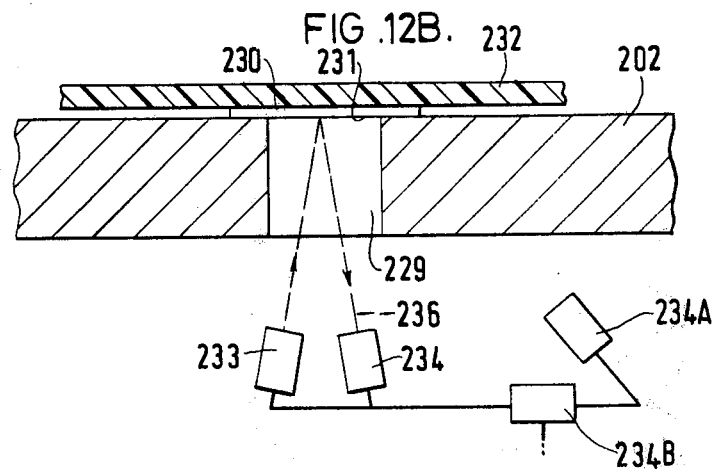

In another embodiment a reflection technique is used which is similar to that described in FIGS. 1(a), (b) except that the record surface does not provide the reflective surface. Referring to FIGS. 12A and 12B, there is associated with a or each one of plural non-reflecting holes in the platter 202, one hole 229 being visible, a hinged flap 230, having its lower surface 231 highly reflecting compared with that of a disc record 232. The flap 230 is sprung in such a way that it is biased away from the platter 202 and forms a small angle with the platter when the latter is not loaded (the condition shown in FIG. 12A). Light from a radiation source, such as a light source 233, is reflected, once per revolution of the turntable platter, from the lower surface 231 of the flap 230 along a light path 235 as the platter rotates in such a way that it does not return to an opto-electronic detector 234. When a disc record 232, of a sufficient size to cover the hole 229 shown, is placed on the turntable platter 202, the weight of the record 232 overcomes the spring biasing so that the flap 230 is forced downwards about its hinge and takes up an attitude parallel to the platter surface, as shown in FIG. 12B. Light emitted from the source 233 strikes the lower surface 231 of the flap 230 and is now returned along a path 236 to the detector 234 once per revolution of the disc record. The wall of the hole 229 is non-reflecting, so that it is better able to absorb the light in the condition shown in FIG. 12A. The flap surface 231 must be kept in a good reflecting condition. An auxiliary detector 234A, which is never exposed to light originating from the emitter source 233 may be used (as explained later) to detect ambient light, which might "confuse" the detector 234.

Figure 13A:
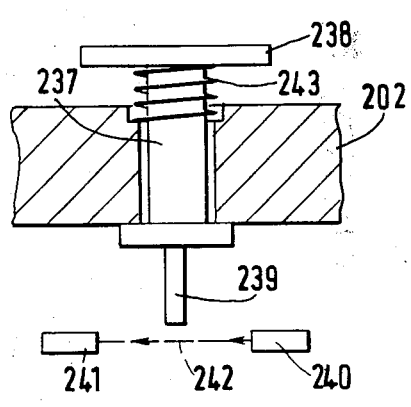
Figure 13B:
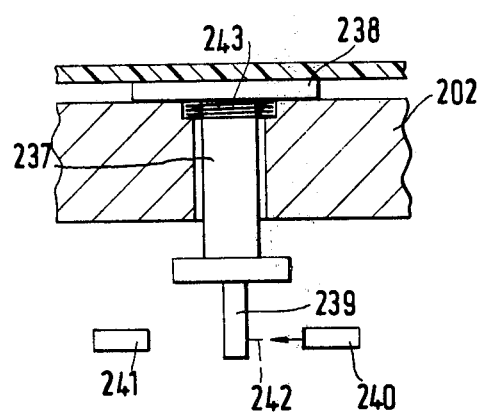

A further embodiment utilises the same general approach as above with light or other radiation emitters and detectors below the turntable, but differs in certain other respects. Referring to FIGS. 13A and 13B the locations on the platter which in the previously described embodiments were occupied by holes at given radii are now occupied by vertically movable shafts, one being shown at 237, with a flange 238 at its upper end and a vertical interceptor screen 239 at its lower end shaft and capable of blocking a (light) radiation transmission path 242 between a source 240 and a detector 241. The shaft is lightly biased vertically upwards by a surrounding coil spring 243, as seen in FIG. 13A, and, when no disc record is resting on top of the flange 238, the path 242 between the associated light source and detector is unobscured (see FIG. 13A). When a record of sufficiently large diameter is placed on the platter to cover the flange 238, the upward bias of the spring 243 is overcome by the weight of the record and the interceptor screen 239 moves downwards until it interrupts the light path 242 between the source 240 and the detector 241 once per revolution of the platter. Alternatively the arrangement may be such that the light path is periodically interrupted when a disc record is absent from the rotating platter and uninterrupted when a disc record is present.

It will have been appreciated that in FIGS. 12A and 12B, or FIGS. 13A and 13B embodiments are shown having even less encumbrance to the loading of disc records in the general area above the platter than do the earlier embodiments, because the radiation emitter or source is placed below the platter, conveniently in the cabinet of a phonograph or pick-up amplifier.

FIGS. 13A and 13B can be said to show the essential features of an arrangement for detecting the presence of an object which has a weight and which is at a given position on a rotatable platter, the arrangement comprising an actuator movable relative to the platter but mounted thereon and rotating therewith, means on the platter to bias the actuator in one direction of its relative movement, receiving means at said given position to receive the object thereon and coupled to the actuator such that the weight of a received object will move the actuator against the bias, a radiation interceptor carried by the actuator and movable therewith when a received object has caused movement of the actuator against its bias to a position of interception of a radiation path once per revolution of the platter, and means to make manifest or signal such periodic interceptions of the radiation path. The given position on a phonograph turntable may be about 4 inches from the centre spindle, so that a 10-inch diameter or larger record will move the radiation interceptor, but a 7-inch diameter record would not. More than one given position on the platter may be provided with more than one respective detector of the presence of an object, so that more than one size or position of an object can be distinguished.

Figure 14A:
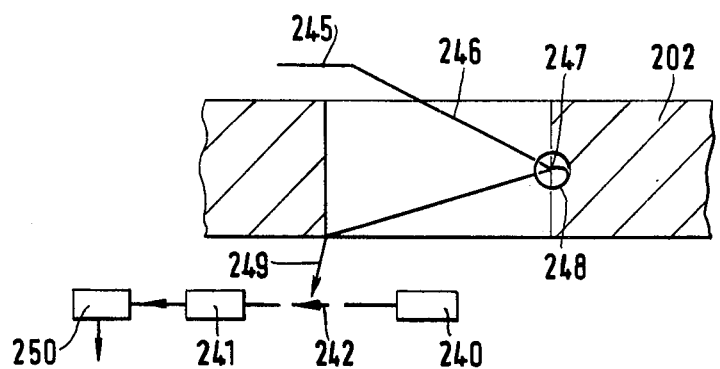
Figure 14B:
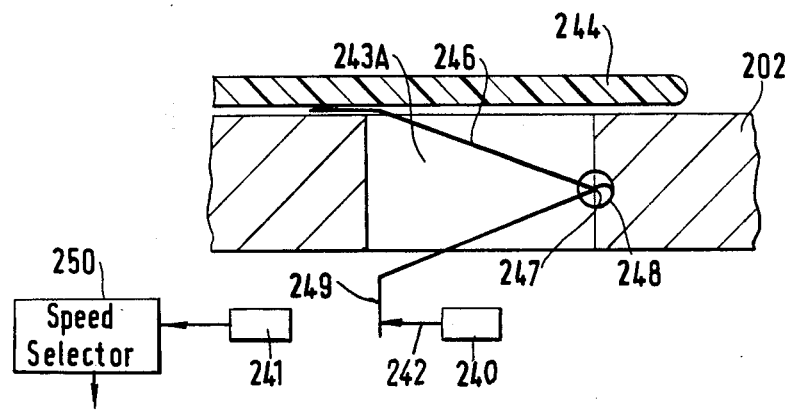

Another embodiment will now be described with reference to the sectional view of a platter 202 shown in FIGS. 14A and 14B, in which a hole 243A in the platter is at a position in which the presence or absence of an object, e.g. a disc record 244 shown in FIG. 14B, is to be detected. At this position there is a record receiving finger 245 attached to the end of one arm of a V-shaped rigid coupling body 246 pivoted at the apex 247 of the V such that the weight of a record 244 on the finger 245 will cause the coupling body 246 to pivot anti-clockwise, as shown, about the apex 247. A torsion spring 248 biases the body clockwise about the pivot so that the finger 245 is raised from the platter 202, as seen in FIG. 14A, when no record is present. In this position of the coupling body 246 an interceptor screen 249 at the end of the other arm of the (V-shaped) body 246 does not block light on a path 242 when between a source 240 and an opto-electronic detector 241 whose output which indicates record size is fed to a speed selector 250 as well as to the presence detector manifestation device which is common to all embodiments. The speed selector circuit 250 automatically controls the speed of rotation of the turntable in accordance with the size of disc record detected. When a record 244 is present, see FIG. 14B, the finger 245 is depressed, the body 246 pivots and the screen 249 periodically intercepts the light path, registering light interruptions at the speed of rotation of the turntable.

Alternatively the apex 247 may be arranged to slide on a vertical rod or slot at or near the right hand extremity of the hole, as viewed in the Figure, and be slid down against an upward bias, to cause the interceptor screen to intercept the light path. Other very lightweight coupling arrangements between a disc record and a light interceptor screen can, of course, be used. The general advantage of such arrangements is that most of the apparatus is at a location in which there is no impediment to loading of the turntable. The essential features of the arrangement of FIGS. 14A and 14B can be seen to be similar to those of the arrangement shown in FIGS. 13A and 13B. It will be understood that arrangements having moving bodies carrying screens are alternatives to the earlier embodiments and it will be seen that some features are similar to or have analogous counterparts in earlier embodiments of FIGS. 1–4. Any of the embodiments may use a speed selector for controlling the speed of rotation of the turntable according to the size of disc detected.

The source modulator 200 is used to "label" the radiations or light from source 201 so that ambient radiation or light, even though quite strong, will cause minimum misreadings. The detector is coupled to signal selection circuitry such that only the labelled radiations originating from source 201 are responded to. Alternatively an auxiliary detector not responsive to source 201 may give information about the ambient light which can be taken into account when evaluating a reading.

In all of the embodiments described by way of example, the presence of an object is not signalled until the turntable is rotating, however, it is possible to provide arrangements in which a similar effect to that described can be produced by the rotation or the simulated rotation of a source or of a detector.

Disc phonograph records are typically black with a polished surface. Visible light is not transmitted by them, but is reasonably well reflected at their surfaces. Hence, the record detection embodiments described relying on obscuration and reflection, in particular, may easily be used with them.

Many of the above-described embodiments propose arrangements in which at least one window is provided in a device, and the different reflectivities obtained from the window when it is covered by an object and when it is not so covered are sensed and distinguished. The generally proposed use of the invention is in detecting the presence of sound disc records, which are usually relatively good reflectors of light or other radiations, on a phonograph turntable. It will be understood, however, that the invention can also be used, in the detection of other disc records for example, in the detection of video discs. Since radiations are able to pass through the window in the turntable, a source and a detector of the radiations can be located in fixed positions beneath the turntable in such a way that reflections of the radiations from the source by a record arranged above the window impinge on the detector once per revolution of the turntable. If no record is present, these periodic reflections will be absent.

Whether or not the turntable itself has a reflecting lower surface is relatively immaterial, since it will be different from that of the record and can be allowed for. A reflecting turntable can be used and such a turntable carrying no record will result in periodic non-illuminations of the detector, while the presence of a record can be detected by differences in the reflections. A non-reflecting turntable carrying a (reflecting) record will result in periodic illuminations of the detector, while the absence of a record will be indicated by an absence of reflections.

A problem can arise if the ambient light above the turntable causes radiations to pass through the window once per revolution, whether or not the lower surface of the turntable is a reflector, and illuminate the detector in a similar way to a record which obscures the window and reflects light from the source.

Arrangements in accordance with the present invention can employ auxiliary signals, as has previously been mentioned, whereby the interference effect of ambient light can be discounted. In the embodiment of FIG. 9A light from the source 201 is "labelled" or identified by an auxiliary signal which it carries by virtue of a modulator or other unit 200. In another embodiment, that of FIGS. 12A and 12B, the auxiliary signal is detected by an auxiliary detector 234A whose output is fed to a comparator 234B in which it is compared with the output from the detector 234 in order to eliminate the effect of ambient light. Other embodiments illustrated herein can also use "labelling" or auxiliary stray radiation detectors.

When the light or other radiation is labelled or identified, the detector response for the source radiation is different from that for any likely ambient radiations. The labelling is preferably achieved by chopping or modulating the radiations emitted from the source, by means of a unit such as that shown at 200, at a rate which is high compared with the turntable speed and hence with the pulse rate at which signals passing through the window are received and detected. An opto-electronic detector for the detection of the radiations will then give an electrical pulse signal output which varies at the high chopping or modulating rate. The electrical pulse signals can then be applied to a circuit including, for example, a series connected high pass or band pass filter (not shown), or a shunt connected low pass filter, so that any pulses which do not have the high rate variations due to the chopping or modulating and which can be ignored as originating from ambient light (or whatever sort of radiation is being used) are not passed through the circuit.

The embodiments employing, in addition to the main detector, an auxiliary detector, may be arranged in any of several ways. The auxiliary detector is usually arranged near the main detector, i.e. beneath the turntable, as in FIGS. 12A and 12B, but it is at a position or is "blinkered" or masked in such a way (as illustrated) that reflections from a record will never reach it for any platter orientation, while light from above the turntable will reach it via the window when no record is present. In one arrangement, the signals from the main detector are not allowed to pass to a following circuit unless no light reaches the auxiliary detector. If light pulses (once per revolution, typically) reach the main detector, the condition is not signalled, since it is assumed that the light pulses are of ambient light unless it is also ascertained that no light reaches the auxiliary detector. Only the condition in which pulses reach one detector but not the other will signify presence of a record.

In a variation of this arrangement the auxiliary detector 234A is arranged to respond to light at a threshold level below that corresponding to light reflections from the record. In this variation the main detector 234 need not be "consulted" if the auxiliary detector 234A gives a good response, because only ambient light through the window 229 can cause any response from the auxiliary detector 234A. If the auxiliary detector gives no response, the main detector 234 results can be relied upon because the ambient light is only very weak, i.e. below the threshold. The main detector 234 can then give responses only if a record is present.

It is possible to display the response from the detector 234 in such a way that it can be read by an operator. However, in a preferred embodiment a logic circuit is used with the threshold detector so that human errors in reading the signals are eliminated. Either a '1' indication by the auxiliary detector, or two '0' indications, means "no record present", it being assumed that a 1 subsists when a light response is obtained once per turntable cycle, using a non-reflecting turntable. The use of a reflecting turntable will alter the logic requirements, as will be apparent. This threshold detection enables confidence to be placed in the detector, whether the ambient light is strong or weak, assuming the record reflections to be reliable. In the most common use envisaged, even if a dirty or unconventional record does not provide reflections, the error will be on the safe side, since the pick-up will merely not be mobilized.

If the records are non-reflectors of visible light, other sorts of radiation will have to be used for the source and the detector or detectors.

Coloured records are not unknown and conceivably multicoloured records and records transparent or translucent or partially transparent or translucent to visible light could be produced. Also, but less likely, records with less good reflection properties than those currently produced might be developed. These variations could make it necessary to vary some of the techniques described above or to use them in different combinations. The radiations can be visible light or of other forms, and the details of the techniques employed can be modified accordingly. For example, since most record materials and forms will be opaque to, and good reflectors of, infrared radiation, radiations in the infrared range might be usefully employed.

Although the invention has been described, by way of example, with reference to specific embodiments, it will be understood that variations and modifications can be made within the scope of the invention.

We claim:
1. Apparatus for use in detecting the presence of a disc record on a turntable, including means comprising a source of energy and means for detecting the energy from said source, the arrangement being such that at least a part of a path for the energy set up between the source means and the detector means is in a region adjacent the surface of the turntable on which the the record rests, and that the path is modified by the presence of a disc record on the turntable.

2. Apparatus for use in detecting the presence of a disc record on a turntable, including a source of energy and a detector of the energy, the arrangement being such that a path for the energy is set up between the source and the detector, the path being modified by the presence of a disc record on the turntable, said path having a straight portion lying in the plane of a disc on the turntable.

3. Apparatus as claimed in claim 2 wherein the path has a finite width in the plane of the disc and more of the path is blocked across its width with an increase in the diameter of the disc.

4. Apparatus as claimed in claim 1 wherein the turntable defines a hole, and energy intercepting means associated with said hole, the association of said energy intercepting means with the hole modifying the said energy path according to whether or not a disc is present on the turntable.

5. Apparatus as claimed in claim 4 wherein the turntable defines a plurality of the said holes, each at a different distance from the centre of the turntable, and a respectively associated means is provided in each hole for use in detecting a different size of disc record.

6. Apparatus for use in detecting the presence of a disc record on a turntable, including a source of energy and a detector of the energy, the arrangement being such that a path for the energy is set up between the source and the detector, that the path is modified by the presence of a disc record on the turntable, wherein the turntable defines a hole so arranged that the association of energy intercepting means with the hole can be used to modify the said energy path according to whether or not a disc is present on the turntable, said source and the detector both being located on the side of the plane in which the turntable lies opposite to that on which a record is located and a disc record, when present on the turntable, provides the energy intercepting means and causes a reflectivity to be presented to energy from the source passing through the hole which is different from that presented by the turntable.

7. Apparatus as claimed in claim 4 including a flap means associated with the hole, which flap is movable responsive to a disc being positioned on the turntable to cause the said energy path to be modified.

8. Apparatus for use in detecting the presence of a disc record on a turntable, including a source of energy and a detector of the energy, the arrangement being such that a path for the energy is set up between the source and the detector, the path being modified by the presence of a disc record on the turntable, the turntable defining a hole so arranged that the association of energy intercepting means with the hole can be used to modify the said energy path according to whether or not a disc is present on the turntable, said turntable defining a plurality of the said holes, each at a different distance from the centre of the turntable, a respective associated means is provided in each hole for use in detecting a different size of disc record, and an insert having an energy reflecting wall in a hole.

9. Apparatus for use in detecting the presence of a disc record on a turntable, including a source of energy and a detector of the energy, the arrangement being such that a path for the energy is set up between the source and the detector, the path being modified by the presence of a disc record on the turntable, the turntable defining a hole so arranged that the association of energy intercepting means with the hole can be used to modify the said energy path according to whether or not a disc is present on the turntable, said hole defined by the turntable being a radially extending slot in the surface of the turntable, including detector means to detect the length of the said slot which is covered when a disc record is present on the turntable, thereby to enable a measure of the diameter of the record to be provided.

10. Apparatus for use in detecting the presence of a disc record on a turntable, including a source of energy and a detector of the energy, the arrangement being such that a path for the energy is set up between the source and the detector, the path being modified by the presence of a disc record on the turntable, and means for labelling the energy from the source whereby stray or ambient energy of the same type can be discriminated against.

11. Apparatus as claimed in claim 1 wherein the source of energy, the path along which the energy leaves the source, the detector and the path along which energy enters the detector are relatively stationary.

12. Apparatus as claimed in claim 8 having a prism so arranged in the hole that energy is directed along the path.

* * * * *